(12) United States Patent
Collins

(10) Patent No.: US 7,568,314 B2
(45) Date of Patent: Aug. 4, 2009

(54) FLASHING KIT FOR WALL PENETRATIONS

(75) Inventor: P. Michael Collins, Cincinnati, OH (US)

(73) Assignee: PACC Systems I.P., LLC, Cincinnati, OH (US)

( * ) Notice: Subject to any disclaimer, the term of this patent is extended or adjusted under 35 U.S.C. 154(b) by 615 days.

(21) Appl. No.: 11/192,565

(22) Filed: Jul. 29, 2005

(65) Prior Publication Data
US 2006/0027388 A1 Feb. 9, 2006

Related U.S. Application Data

(60) Provisional application No. 60/599,122, filed on Aug. 5, 2004.

(51) Int. Cl.
E04H 12/28 (2006.01)
E04D 1/36 (2006.01)

(52) U.S. Cl. .................. 52/60; 52/58; 52/219; 52/514; 52/220.8

(58) Field of Classification Search .............. 52/58, 52/59, 60, 61, 62, 302.6, 198, 42, 220.8, 52/218, 219, 232; 285/42, 43; 174/483
See application file for complete search history.

(56) References Cited

U.S. PATENT DOCUMENTS

| 791,068 | A | * | 5/1905 | Baker ..................... 285/43 |
| 917,167 | A | | 4/1909 | Shaw |
| 1,494,234 | A | | 5/1924 | Gossett |
| 1,651,269 | A | * | 11/1927 | Gnagi ................. 52/741.1 |
| 2,054,308 | A | | 9/1936 | Tucker |
| 2,574,142 | A | * | 11/1951 | Buongirno ............. 165/77 |
| 3,571,972 | A | | 3/1971 | Carter, Jr. |
| 3,708,185 | A | | 1/1973 | Bilicki et al. |
| 3,871,145 | A | | 3/1975 | Hatmaker |
| 3,905,165 | A | * | 9/1975 | Kneisel ..................... 52/58 |
| 4,248,926 | A | | 2/1981 | Tajima et al. |
| 4,570,396 | A | | 2/1986 | Struben |
| 4,623,171 | A | * | 11/1986 | Wilson ..................... 285/42 |
| 4,739,596 | A | * | 4/1988 | Cunningham et al. ...... 52/220.8 |
| 4,937,991 | A | * | 7/1990 | Orth ..................... 52/199 |
| 5,226,263 | A | * | 7/1993 | Merrin et al. ............ 52/58 |
| 5,421,127 | A | * | 6/1995 | Stefely ..................... 52/1 |
| 5,526,619 | A | | 6/1996 | Vagedes |
| 5,548,934 | A | * | 8/1996 | Israelson ............... 52/220.8 |
| 5,970,667 | A | * | 10/1999 | Thaler ..................... 52/219 |
| 6,176,052 | B1 | * | 1/2001 | Takahashi ............... 52/232 |

(Continued)

Primary Examiner—Richard E Chilcot, Jr.
Assistant Examiner—Alp Akbasli
(74) Attorney, Agent, or Firm—Wood, Herron & Evans, LLP

(57) ABSTRACT

A flashing kit seals or waterproofs a hole in a wall with a conduit penetrating therethrough. The flashing kit generally includes a first flashing member adapted to be mounted to the wall adjacent the hole, a second flashing member adapted to be mounted to the wall adjacent the hole and the first flashing member, a third flashing member wrapped onto the conduit adjacent the first and second flashing members, and a fourth flashing member adapted to be applied to the wall over the first and second flashing members. The fourth flashing member has an aperture for receiving the conduit and may include one or more leaves spaced about the aperture. The leaves are adapted to bend in order to accommodate the conduit and are covered by a fifth flashing member wrapped around the conduit.

20 Claims, 2 Drawing Sheets

U.S. PATENT DOCUMENTS

| | | | |
|---|---|---|---|
| 6,495,753 B1 * | 12/2002 | Goodsell et al. | 174/483 |
| 6,543,186 B2 | 4/2003 | Gilleran | |
| 6,574,930 B2 * | 6/2003 | Kiser | 52/232 |
| 6,588,801 B1 | 7/2003 | Mayle | |
| 6,601,351 B1 | 8/2003 | Zerfoss | |
| 6,691,469 B2 * | 2/2004 | Miller | 52/60 |
| 6,691,473 B1 * | 2/2004 | Mayle et al. | 52/198 |
| 6,694,684 B2 * | 2/2004 | Radke et al. | 52/232 |
| 6,705,050 B2 * | 3/2004 | Nichols, Jr. | 52/62 |
| 6,792,726 B1 * | 9/2004 | Price | 52/220.8 |
| 6,892,499 B1 * | 5/2005 | Mayle | 52/219 |
| 7,082,730 B2 * | 8/2006 | Monden et al. | 52/232 |
| 7,114,301 B2 * | 10/2006 | Bibaud et al. | 52/219 |
| 2003/0177712 A1 | 9/2003 | Gatherum | |
| 2004/0168398 A1 * | 9/2004 | Sakno et al. | 52/741.4 |
| 2004/0200174 A1 * | 10/2004 | Register | 52/518 |
| 2005/0028456 A1 * | 2/2005 | McLane et al. | 52/58 |
| 2006/0265980 A1 * | 11/2006 | Vaughan | 52/220.8 |
| 2007/0220819 A1 * | 9/2007 | Neuschafer et al. | 52/219 |

* cited by examiner

FLASHING KIT FOR WALL PENETRATIONS

CROSS REFERENCE TO RELATED APPLICATION

This application claims the benefit of and priority to U.S. Provisional Patent Application Ser. No. 60/599,122, filed Aug. 5, 2004, and entitled "FLASHING KIT FOR WALL PENETRATIONS," which is fully incorporated by reference herein.

FIELD OF THE INVENTION

This invention relates generally to prohibiting weather-related moisture from entering a building, and more particularly, to a flashing kit for a conduit penetrating through a hole in the exterior wall of a building.

BACKGROUND OF THE INVENTION

In the construction of houses, commercial buildings, and the like, various utility/plumbing pipes such as water pipes, gas pipes, drain pipes, HVAC ducts, electrical cables, telephone cables, etc., extend through the walls of the building. When exteriorly terminated, these conduits extend through insulation, between wall boards, potentially within ceiling and floor structures, and in other critical places where a dry environment is extremely important for both structural, health, and safety considerations. A hole approximating the size of the conduit is formed or cut in the wall and the conduit projects through the wall. The exteriorly exposed conduits are periodically subjected to water sources, whether from rain, snow, lawn sprinklers, vandalism, or other sources. Such water has a natural tendency to travel rearwardly on the exterior of the pipe for attempted entry into the building structure. If such water enters through the exterior building wall, it can cause substantial damage to insulation, drywall, wood moldings, flooring, and carpeting on the interior of the building. However, typically the penetration through the wall is either not sealed to prevent water, moisture, or air penetration, or is poorly sealed with a wad of roofing tar, asphalt or the like which in a hot environment sags and, over time, provides little, if any, protection.

The importance of attempting to mitigate water entry through such wall openings has been recognized by the building industry with various recent attempts to prevent such rearward water travel. One approach utilizes caulking material applied at the interface of the conduit with lathing paper disposed immediately behind the conduit outlet. Thereafter, stucco or other exterior finish material is applied over the lathing paper to be adjacent to the exposed conduit. Over time, however, such caulking can eventually crack and break, and when this occurs, water can freely travel along the conduit surface and into the interior of the building structure.

Another common approach entails hand measuring and cutting sheet metal to create flashing for every conduit outlet at a job site. Each flashing is thereafter fitted around the respective conduit behind the wall opening and is nailed into place and caulked. Once again, although this approach can work initially, the caulking material eventually gives way or is not initially caulked properly so as to allow water to travel rearwardly over the conduit surface and into the structure.

In summary, known approaches to prevent water entry suffer from significant problems, including limited long-term effectiveness, limited operating temperature ranges, labor intensive construction and installation procedures, and unreliable moisture penetration prevention.

In view of the above described conditions and consequences of prior art solutions, a weatherproofing solution that is not subject to these shortcomings and installation errors, and that lasts the life of the building structure is needed. Accordingly, a primary object of this invention is to provide a conduit flash device that prevents rearward water flow over the exterior surface of the conduit and into the interior of a building.

Another object of this invention is to provide such a flashing device that accommodates a range of conduit sizes and shapes while not losing effectiveness.

Yet another object of this invention is to provide a flashing device whose structure is integrateable with and securable to exterior wall construction material.

These and other objects of this invention will become apparent throughout the description thereof which now follows.

SUMMARY OF THE INVENTION

This invention provides a flashing kit for a conduit penetrating through a hole in a wall. Although the invention is intended primarily for use in cavity wall construction, those skilled in the art will appreciate that the flashing kit may be used to seal or waterproof any exterior building wall or roof. Moreover, the flashing kit may be used for any penetration through the wall.

In general, the flashing kit in one embodiment comprises a first flashing member adapted to be mounted to the wall adjacent the hole and a second flashing member adapted to be mounted to the wall adjacent the hole and the first flashing member. The first flashing member has a notch configured to surround a lower portion of the conduit, while the second flashing member has a notch configured to surround an upper portion of the conduit. In one embodiment, a lower portion of the second flashing overlaps an upper portion of the first flashing member. The flashing kit also comprises a third flashing member wrapped onto the conduit adjacent the first and second flashing members. A fourth flashing member that has an aperture for receiving the conduit and is adapted to be applied to the wall over the first and second flashing members.

In a further aspect of this invention, the fourth flashing member further includes one or more slits spaced about the aperture. The one or more slits define one or more leaves adapted to bend along the length of the conduit and adhere thereto when the fourth flashing member is applied to the wall. The flashing kit may also include a fifth flashing member wrapped onto the conduit over the one or more leaves. Such a configuration helps prevent water and moisture from traveling along the exterior of the conduit and entering the hole in the wall. Additionally, the flashing kit of this invention also serves as an air barrier to inhibit air flow through the wall. Moreover, a flashing kit according to this invention may be easily and efficiently installed during building construction for a variety of conduit sizes and shapes, thereby promoting its use and long-term water penetration prevention.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Referring to FIGS. 1-4, a flashing kit 10 according to one embodiment of this invention is shown being installed at a site on an exterior wall 12 of a building in conjunction with a conduit 14 projecting through a hole 16 in the wall 12. The flashing kit 10 of this invention can be readily used for any penetration through any wall to prevent and inhibit water, moisture, air and foreign elements from passing through the hole in the wall. Moreover, while the conduit 14 is shown with a generally circular cross-sectional configuration, the components of the flashing kit 10 can be readily used and adapted for use with any shape conduit or other element penetrating through any size or shape hole in the wall. The conduit 14 may be used for housing various utilities, such as gas, water, electrical wires, communication wires, telephone wires, or anything else extending through the wall 12.

Figure 1:
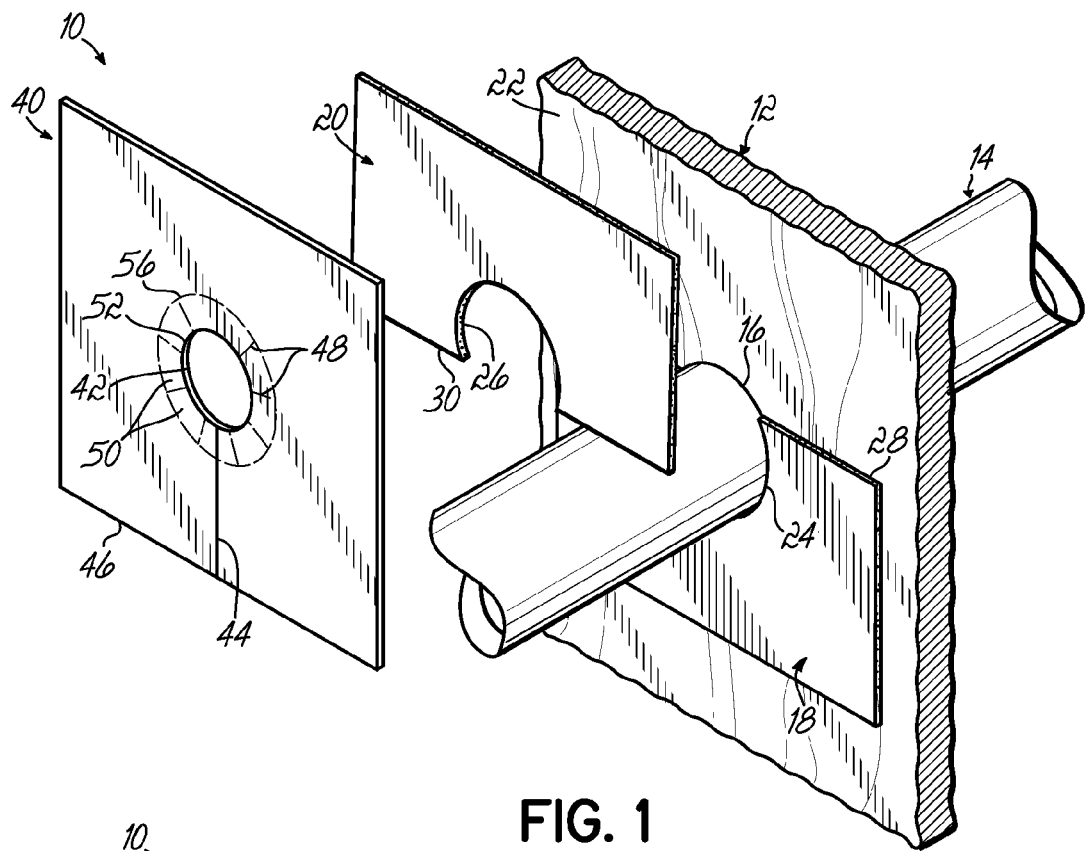
FIG. 1 is a perspective view of a portion of an exterior building wall with a conduit protruding through a hole in the wall and components of a flashing kit according to one embodiment of this invention initially being installed.

The flashing kit 10 according to one embodiment of this invention and as shown in FIGS. 1-4 includes principally several different elements. The components of the flashing kit 10 will be described generally in the order in which they are preferably installed at the job site. First and second flashing members 18, 20 are similarly configured and are each adapted to be mounted to an exterior surface 22 of the building wall 12 adjacent the hole 16. The first and second flashing members 18, 20 are generally rectangularly-shaped, each with an arcuate notch 24, 26 formed along confronting edges 28, 30 of the respective flashing members 18, 20. The arcuate notch 24 in the first flashing member 18 is formed in the upper edge 28 of the first flashing member 18, and is sized and configured to surround a lower portion of the conduit 14 and hole 16 when the first flashing member 18 is mounted on the exterior surface 22. Preferably, the notch 24 allows for the upper edge 28 of the flashing member 18 to extend over the equator or midline of the conduit 14, as shown in FIG. 1.

Figure 2:
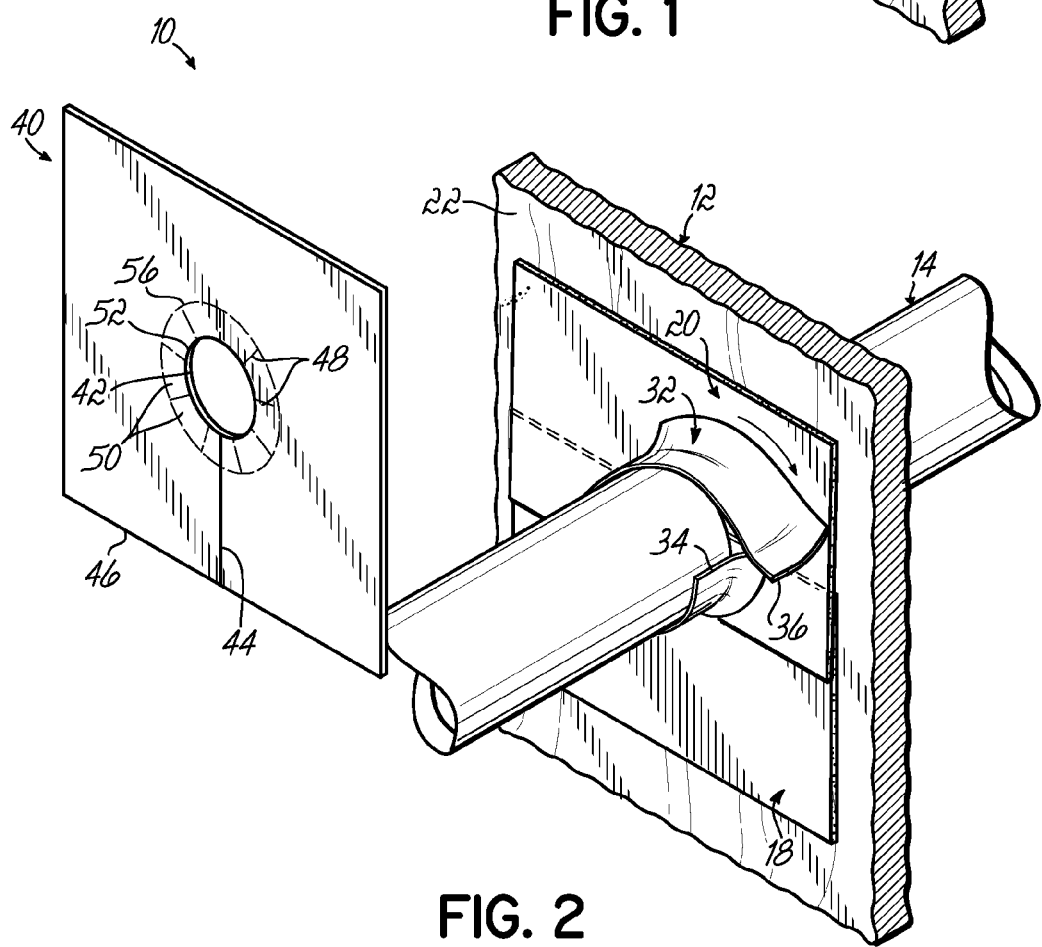
FIG. 2 is a view similar to FIG. 1 with additional components of the flashing kit being installed.

The second flashing member 20 is generally a mirror image of the first flashing member 18 and the notch 26 is positioned along the lower edge 30 of the second flashing member 20 to surround an upper portion of the conduit 14 and hole 16. The lower edge 30 of the second flashing member 20 preferably extends below the midline or equator of the conduit 14 to thereby overlap the upper edge 28 of the first flashing member 18, as shown in FIG. 2. Flashing members 18, 20 define the hole size for the conduit 14 opening. Typically, the hole in the wall is either larger than the conduit or irregular in shape. The flashing members 18, 20 define a standardized hole that can be sealed with this invention. Such an arrangement inhibits water or moisture from draining downwardly between the upper edge 28 of the first flashing member 18 and the exterior surface 22 of the wall 12. Preferably, the outer perimeters of the first and second flashing members 18, 20 extend substantially beyond the region of the wall 12 surrounding the hole 16 as shown in FIG. 2.

The third flashing member 32 is an elongate element generally having a tape-like configuration. The length of the third flashing member 32 is preferably about 125 percent of the circumference of the conduit 14. A leading edge 34 of the third flashing member 32 is initially applied to the conduit 14 at approximately the midline or equator of the conduit 14. As shown in FIG. 2, the third flashing member 32 is then wrapped in a downwardly direction around and onto the conduit 14 adjacent the first and second flashing members 18, 20 on the exterior surface 22 of the wall 12. Preferably, the length of the third flashing member 32 permits a trailing edge 36 to be positioned proximate the bottom portion of the conduit 14. The leading edge 34 is covered by the remainder of the third flashing member 32 to thereby prevent moisture and water from seeping between the leading edge 34 and surface of the conduit 14. Likewise, the trailing edge 36 of the third flashing member 32 is positioned proximate the bottom portion of the conduit 14 to thereby inhibit moisture and water from seeping downwardly between the trailing edge 36 and the surface of the conduit 14. The third flashing member 32 may be shaped to adhere to the surface of the conduit 14 and the faces of flashing members 18, 20.

The fourth flashing member 40 of the flashing kit 10 is a generally rectangular component with a central hole or aperture 42 therein. As shown in FIGS. 1-4, the aperture 42 of the fourth flashing member 40 is generally circular for compatibility with the generally circular cross-sectional configuration of the conduit 14. However, other embodiments of the fourth flashing member 40 may include different shaped apertures 42 which may or may not correspond to the configuration of the conduit 14 onto which the member 40 is to be installed. The diameter of the aperture 42 is preferably smaller than the corresponding dimension of the conduit 14 for reasons to be detailed herein below.

The fourth flashing member 40 also includes a major slit 44 extending from the aperture 42 to a peripheral edge 46 of the fourth flashing member 40. As shown generally in FIG. 3, the major slit 44 facilitates installation of the flashing member 40 onto the conduit 14 so that the fourth flashing member 40 overlaps the first and second flashing members 18, 20 on the exterior surface 22 of the wall 12. The size and configuration of the fourth flashing member 40 is preferably at least as big as, and more preferably, larger than the combined outer dimension of the first and second flashing members 18, 20 when installed on the wall 12. Flashing member 40 holds the flashing members 18, 20 and 32 in place to inhibit peeling or removal over time.

Figure 3:
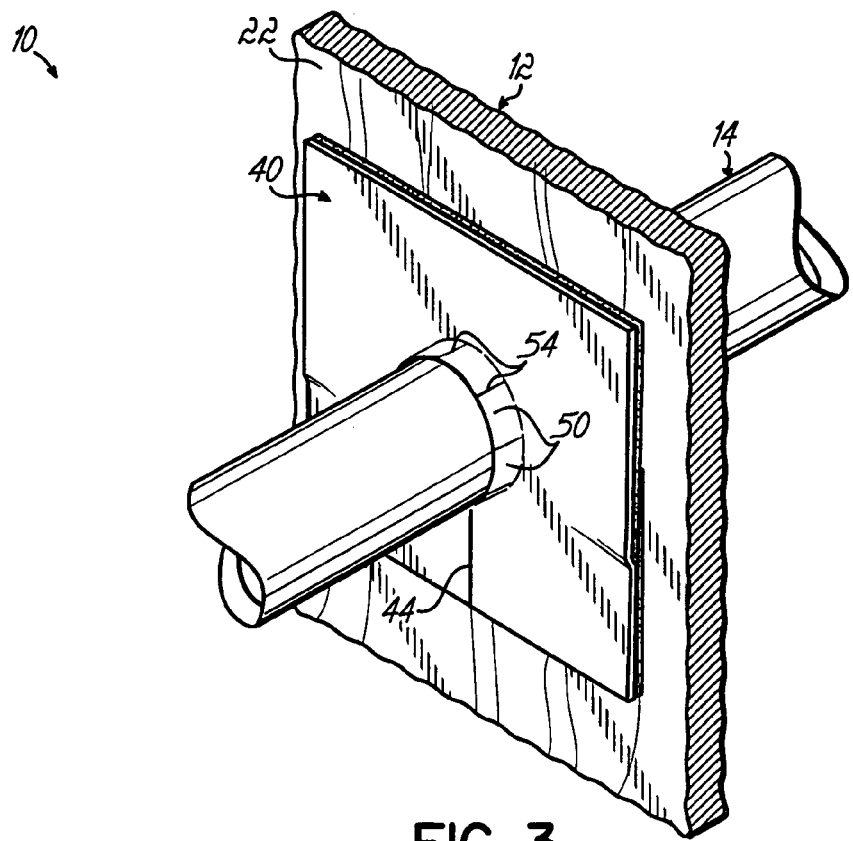
FIG. 3 is a view similar to FIGS. 1 and 2 prior to the final installation of the flashing kit.

The fourth flashing member 40 also includes a series of radially extending slits 48 spaced about the aperture 42. The slits 48 define a number of leaves 50 adjacent the aperture 42. Each leaf 50 includes a free edge 52 at the aperture 42, a pair of side edges 54 defined by adjacent slits 48 in the fourth flashing member 40, and a root edge 56 about which the leaf 50 may be bent relative to the remainder of the fourth flashing member 40 (FIG. 3). The collective shape and configuration of the root edges 56 generally coincides with the shape, configuration, and size of the conduit 14 with the third flashing member 32 applied thereto. As a result, when the fourth flashing member 40 is juxtaposed onto the conduit 14 and over the first, second and third flashing members 18, 20, 32 previously installed on the wall 12 and the conduit 14, the leaves 50 are applied to the conduit 14 and the third flashing member 32. Thus, in an installed position, the leaves 50 are generally oriented perpendicularly with respect to the exterior surface 22 of the wall 12 and the remainder of the fourth flashing member 40.

Figure 4:
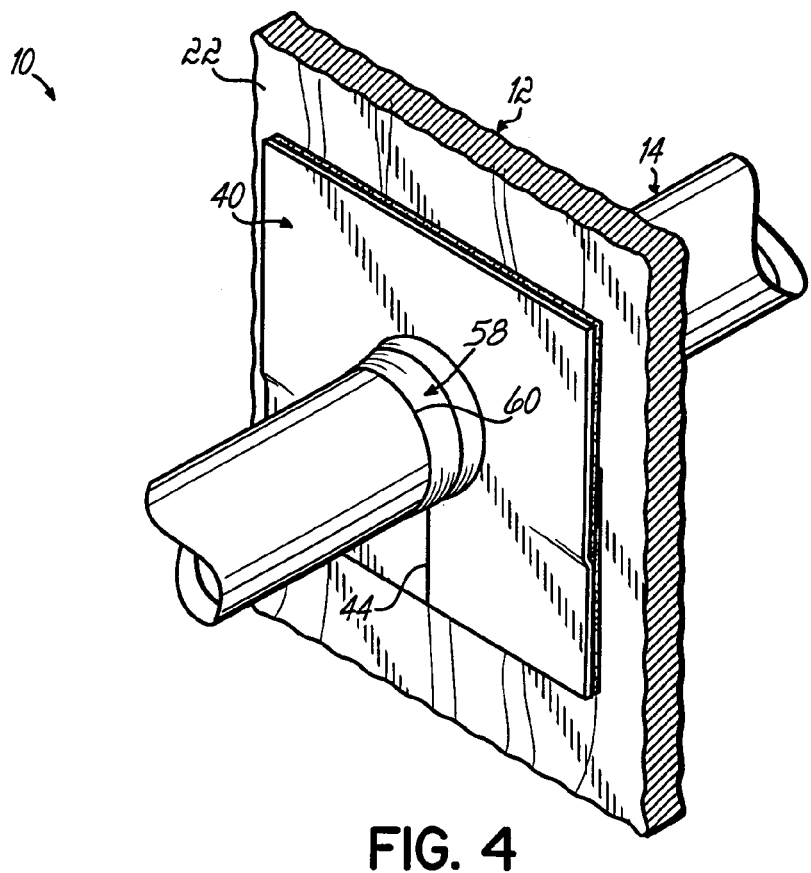
FIG. 4 is a view similar to FIGS. 1-3 with the components of the flashing kit installed.

With reference to FIG. 4, the flashing kit 10 may further include a fifth flashing member 58. In one embodiment, the fifth flashing member 58 is a collar that is wrapped onto the leaves 50 and around the conduit 14 to thereby cover the slits 48 between adjacent leaves 50. The width of the fifth flashing member 58 preferably greater than the length of each leaf 50 such that the fifth flashing member 58 extends outwardly from the root edges 56 to cover the free edges 52 applied on the conduit 14. As shown in FIG. 4, the distal edge 60 of the fifth flashing member 58 is preferably applied directly to the conduit 14 to thereby inhibit moisture and water from traveling along the surface of the conduit 14 between the leaves 50 and into the interior of the building.

The various components of the flashing kit 10 according to this invention may be made of any of a variety of known materials suitable for flashing a wall penetration site. One presently preferred material for each of the flashing members according to this invention is Flexwrap™, which is commercially available from Tyvek®. The Flexwrap™ product is generally a butyl compound containing melamine, cyanurate and aluminum hydroxide as fire retardants. Additionally, each flashing member preferably includes an adhesive surface for applying the components of the flashing kit 10 as previously described. For example, in one embodiment, the first and second flashing members 18, 20 each have an adhesive surface to facilitate mounting to the exterior surface 22 of the wall 12, the third flashing member 32 has an adhesive surface to facilitate mounting onto the conduit 14, the fourth flashing member 40 has an adhesive surface to facilitate applying the fourth flashing member 40 to the wall 22 over the first and second flashing members 18, 20, and the fifth flashing member 58 has an adhesive surface to facilitate wrapping onto the conduit 14 over the leaves 50. The adhesive surface of each flashing member is preferably a butyl adhesive containing a non-halogen fire retardant additive and is preferably covered with a release liner as is well known in the art.

Other materials which may be suitable for one or more of the components of the flashing kit 10 of this invention may be sheet metal, with or without adhesive for mounting to the wall 12 or conduit 14 as appropriate. One benefit of the components of the flashing kit 10 is that complex bending of the materials can be achieved to conform to complex installation geometries even if the materials themselves are not so flexible. For example, more economical materials, although they may be relatively inflexible, can be used for the components of this kit 10 due to the design of the kit 10.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A flashing installation to inhibit the migration of moisture comprising:
   a conduit penetrating through a hole in a wall, the conduit having an upper and lower portion;
   a first flashing member mounted to and in contact with the wall adjacent the hole, the first flashing member having an upper edge with a notch configured to surround the lower portion of the conduit;
   a second flashing member mounted to and in contact with the wall adjacent the hole and the first flashing member, the second flashing member having a lower edge with a notch configured to surround the upper portion of the conduit;
   a third and elongate flashing member oriented generally perpendicularly to the wall and wrapped onto the conduit adjacent the first and second flashing members; and
   a fourth flashing member in contact with and applied over at least portions of the first and second flashing members and the conduit, the fourth flashing member having an aperture receiving the conduit there through.

2. The flashing installation of claim 1, wherein the fourth flashing member further includes one or more slits spaced about the aperture, the one or more slits defining one or more leaves adapted to accommodate the conduit.

3. The flashing installation of claim 2, wherein the one or more leaves have respective free edges and respective root edges, the respective free edges collectively defining an opening smaller than the conduit, the respective root edges collectively being shaped to surround the conduit.

4. The flashing installation of claim 3, wherein the one or more leaves are adapted to bend about the respective root edges when the aperture of the fourth flashing member receives the conduit.

5. The flashing installation of claim 4, wherein the fourth flashing member has an adhesive surface such that the one or more leaves are adapted to adhere to the conduit.

6. The flashing installation of claim 1, wherein the fourth flashing member has a peripheral edge and further includes a slit extending from the peripheral edge to the aperture in order to facilitate receiving the conduit.

7. The flashing installation of claim 1, wherein a lower portion of the second flashing member overlaps an upper portion of the first flashing member.

8. The flashing installation of claim 1, wherein the first and second flashing members each have an adhesive surface to facilitate mounting to the wall, the third flashing member has an adhesive surface to facilitate mounting onto the conduit, and the fourth flashing member has an adhesive surface to facilitate applying the fourth flashing member to the wall over the first and second flashing members.

9. The flashing installation of claim 4, further comprising:
   a fifth flashing member wrapped onto the conduit and in contact with one or more leaves of the fourth flashing member.

10. The flashing installation of claim 9, wherein the fifth flashing member has a distal edge adapted to be applied directly to the conduit.

11. The flashing installation of claim 1, wherein the fourth flashing member has a peripheral edge and further includes a slit extending from the peripheral edge to the aperture in order to facilitate accommodating the conduit.

12. The flashing installation of claim 1, wherein the first, second, third, and fourth flashing members are each generally planar and flexible to conform to the surface on which each is applied.

13. The flashing installation of claim 1, wherein the first, second, third, and fourth flashing members are each generally impervious to water.

14. A flashing installation to inhibit the migration of moisture comprising:
   a conduit penetrating through a hole in a wall, the conduit having an upper and lower portion;
   a first flashing member mounted to and in contact with the wall adjacent the hole and in contact with the conduit, the first flashing member having an upper portion with a notch configured to surround and contact the lower portion of the conduit;
   a second flashing member mounted to and in contact with the wall adjacent the hole and the first flashing member, the second flashing member having a lower portion with a notch configured to surround and contact the upper portion of the conduit, wherein the lower portion of the second flashing member overlaps the upper portion of the first flashing member;

a third and elongate flashing member oriented generally perpendicularly to the wall and wrapped onto and in contact with the conduit adjacent the first and second flashing members;

a fourth flashing member in contact with and applied over the first and second flashing members, the fourth flashing member having an adhesive surface, a peripheral edge, an aperture to receive the conduit, a slit extending from the peripheral edge to the aperture to facilitate receiving the conduit, and one or more slits spaced about the aperture, the one or more slits defining one or more leaves adapted to bend in order to accommodate the conduit; and a fifth flashing member wrapped onto the conduit and in contact with one or more leaves of the fourth flashing member, the fifth flashing member having a distal edge applied directly to the conduit;

wherein the first, second, third, and fourth flashing members are each generally impervious to water and generally planar and flexible to conform to the surface on which each is applied.

15. The flashing installation of claim 1 wherein the third flashing member is an elongate member having a first longitudinal terminal end spaced from a second longitudinal terminal end and the second longitudinal terminal end is juxtaposed to cover the first longitudinal terminal end in an overlapping two ply arrangement of the third flashing member when the third flashing member is wrapped circumferentially onto the conduit.

16. The flashing installation of claim 15, wherein at least one of the first and second flashing members further includes one or more slits defining one or more leaves to accommodate the conduit.

17. The flashing installation of claim 15, wherein at least one of the first and second lashing members has a peripheral edge and further includes a slit extending from the peripheral edge to facilitate receiving the conduit.

18. The flashing installation of claim 1 wherein the first and second flashing members each contact the conduit.

19. The flashing installation of claim 1 wherein an entire face of the first flashing member is in contact with the wall.

20. The flashing installation of claim 14 wherein an entire face of the first flashing member is in contact with the wall.

* * * * *

UNITED STATES PATENT AND TRADEMARK OFFICE
CERTIFICATE OF CORRECTION

PATENT NO.        : 7,568,314 B2
APPLICATION NO.   : 11/192565
DATED             : August 4, 2009
INVENTOR(S)       : P. Michael Collins It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Seventh Day of September, 2010

David J. Kappos
*Director of the United States Patent and Trademark Office*